United States Patent
Layman

[15] 3,685,671
[45] Aug. 22, 1972

[54] STACKING LIGHTWEIGHT PLASTIC ARTICLES

[72] Inventor: Lee R. Layman, Windsor Locks, Conn.

[73] Assignee: Monsanto Company, St. Louis, Mo.

[22] Filed: March 25, 1970

[21] Appl. No.: 22,422

[52] U.S. Cl..............214/6 BA, 214/6 DS, 214/7, 301/2 R, 301/31
[51] Int. Cl.......................................B65g 57/30
[58] Field of Search......214/6 BA, 7, 6 D, 6 DS, 152; 271/74, 87, 26; 302/31, 2 R

[56] References Cited

UNITED STATES PATENTS

| | | | |
|---|---|---|---|
| 3,337,064 | 8/1967 | Mojden et al................214/7 |
| 3,460,685 | 8/1969 | Kirkhoff...................214/6 D |
| 3,208,604 | 9/1965 | Taylor et al. ..............214/7 |
| 2,948,381 | 8/1960 | Penn.......................214/7 X |
| 3,341,031 | 9/1967 | Myers....................214/6 BA |
| 3,210,124 | 10/1965 | Niemi et al................302/2 R |
| 3,220,724 | 11/1965 | Von Glahn ..............271/87 X |

Primary Examiner—Robert J. Spar
Attorney—James C. Logomasini, Michael J. Murphy and Neal E. Willis

[57] ABSTRACT

A method for automatically stacking lightweight plastic articles being ejected from plastic shaping equipment which involves air conveying the articles in tandem away from the shaping equipment to a transition zone without changing the orientation of the articles from that existing on ejection from the shaping equipment, turning or changing the direction of movement of the articles in the transition zone by means of the air while continuing the air conveying movement such that the peripheries of successively adjacent articles are substantially parallel to each other and feeding each thus turned article by means of the air to the nip of continuously and oppositely rotating friction wheels to advance each article through the nip to the base of an ever-increasing stack resting on the wheels beyond the nip. The apparatus includes a conveying duct for the articles, means for introducing high velocity conveying air into the duct, dual friction wheels aligned opposite each other adjacent the discharge end of the duct and means for rotating the friction wheels at a constant speed.

6 Claims, 2 Drawing Figures

FROM LOW PRESSURE AIR SOURCE

PATENTED AUG 22 1972  3,685,671

FROM LOW PRESSURE AIR SOURCE

INVENTOR.
LEE R. LAYMAN
BY
Michael J. Murphy
ATTORNEY

STACKING LIGHTWEIGHT PLASTIC ARTICLES

STACKING LIGHTWEIGHT PLASTIC ARTICLES

BACKGROUND OF THE INVENTION

This invention relates to stacking lightweight plastic articles and more particularly to collecting and stacking such articles as they are cyclically ejected from plastic shaping equipment.

One type of trim in place thermoforming of plastic articles from sheet material involves sealing portions of a heated sheet in a forming press around the peripheries of molds conforming to the shape of the articles, forcing the sheet portions within the seals into the molds to form the articles, advancing cutting elements substantially but not completely into each sheet portion around the periphery of each article and then advancing the sheet with the articles thus held therein away from the forming area and across a stripping roll. The articles because of the strength imparted to them during forming will proceed substantially parallel to the direction of advancement and, therefore, break out of the sheet along the score lines formed by the cutting elements while the resulting web proceeds into the nip of downstream advancing rolls where it is collected for reuse. Successively formed articles are thus cyclically discharged from the furthest downstream end of the shaping equipment. This particular type of forming is disclosed in more detail in U.S. Pat. No. RE 26,413.

In an automated system of this type, it has been conventional in the past to eject articles discharged in this fashion onto the surface of an endless belt conveyor where they are transported and held thereon by their own weight away from the shaping equipment to the discharge end of the conveyor. A timed gate device at the discharge end then allows each article to proceed individually from the conveyor surface into successive compartments of a vertically indexing elevator, which in turn feeds the articles to the base of a stack above the elevator from where they are removed for further packaging after reaching a predetermined height.

Though this means for handling the formed articles has generally functioned satisfactorily in the past, this takeoff portion of the system becomes limiting as the overall capacity of the shaping equipment is increased by incorporating certain process and apparatus improvements into the upstream equipment to substantially reduce cycle time. Thus, as one article is entering an oppositely aligned compartment in the elevator, its trailing edge may be beneath the leading end of the next arriving and closely spaced article such that as the former is being lifted by the elevator it may overturn the latter. The takeoff system just described also depends for successful operation on the amount of friction between the article and its supporting surface, whether it be that of the conveyor or that of the elevator, and as the speed of these components is increased to handle the increased capacity, it becomes more and more difficult to maintain the articles consistently in the desired location on the surfaces of the various components of the takeoff equipment without operator attention.

SUMMARY OF THE INVENTION

Now there has been discovered a unique system for collecting and stacking lightweight plastic articles which is not dependent for successful operation on friction developed between the article and a supporting surface.

Accordingly, it is a principal object of this invention to provide an improved method and apparatus for automatically collecting and stacking lightweight plastic articles.

Another object of this invention is to provide method and apparatus improvements for increasing the overall capacity of a trim in place thermoforming installation.

A further object of this invention is to provide a facile, high speed system for stacking lightweight thermoplastic containers being cyclically discharged from plastic shaping equipment.

An additional object of this invention is to provide a method and apparatus for accelerating lightweight plastic articles away from their place of discharge from plastic shaping equipment at a velocity which greatly exceeds their velocity just prior to discharge in order that a handling operation may be carried out on one article without interference from the next successive article.

Yet another object of this invention is to provide a method and apparatus for automatically stacking lightweight plastic articles being separated from a thermoplastic sheet in a direction which is collinear with that of sheet advance through the article forming apparatus.

Other objects of this invention will in part be obvious and will in part appear hereinafter.

These and other objects are accomplished by providing a method of automatically stacking lightweight plastic articles being ejected from plastic shaping equipment which comprises air conveying the articles in tandem away from the shaping equipment to a transition zone without substantially changing the orientation of the periphery of each article with respect to the next succeeding article from that existing on ejection from the shaping equipment, turning the articles in the transition zone by means of the air while continuing the air conveying movement such that the peripheries of successively moving articles leaving the transition zone are substantially parallel to each other, and feeding each successive article leaving the zone by means of the air to the nip of continuously and oppositely rotating friction wheels to frictionally advance each article through the nip across a peripheral portion of each wheel and thereby form a continuously increasing stack of the articles resting on the wheels beyond the nip.

The apparatus includes a conveying duct for the articles having an article receiving end and an article discharge end, means adjacent the receiving end for introducing high velocity conveying air into the duct, dual friction wheels aligned opposite each other immediately adjacent the discharge end, said wheels having peripheral portions overlapping an imaginary extension of the walls of the duct defining the discharge end, and means for continuously rotating the wheels at constant speed in opposite directions.

BRIEF DESCRIPTION OF THE DRAWINGS

In describing the overall invention, reference will be made to the accompanying drawings in which.

DETAILED DESCRIPTION OF THE PREFERRED EMBODIMENT

Figure 1:
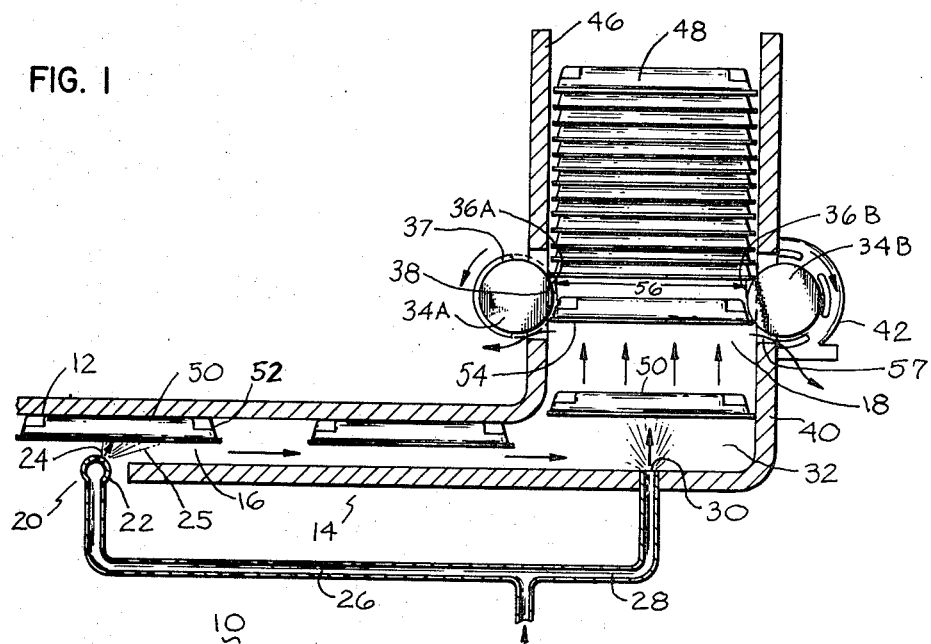
FIG. 1 is a schematic, vertical, sectional view of one form of the apparatus of the present invention.

Referring now to the drawings, there is shown in FIG. 1, apparatus 10 for automatically stacking lightweight plastic articles being cyclically ejected from plastic shaping equipment. In the illustrated embodiment, these articles are in the form of shallow, rectangular, thermoformed containers such as trays 12 weighing between 4 to 15 grams. Each tray 12 has a body section which comprises a base 50 having sides 52 extending upwardly and outwardly therefrom when the tray is seated in an upright position. Each tray 12 has an open end defined by the periphery at the upper end of sides 52. Though a shallow packaging container is illustrated, it is obvious that the system is operable with other forms or shapes of lightweight plastic articles of manufacture. The apparatus of FIG. 1 is preferably though not necessarily, mounted immediately adjacent the discharge end of table 120 of the apparatus illustrated in FIG. 2 of U.S. Pat. No. RE 26,413.

Figure 2:
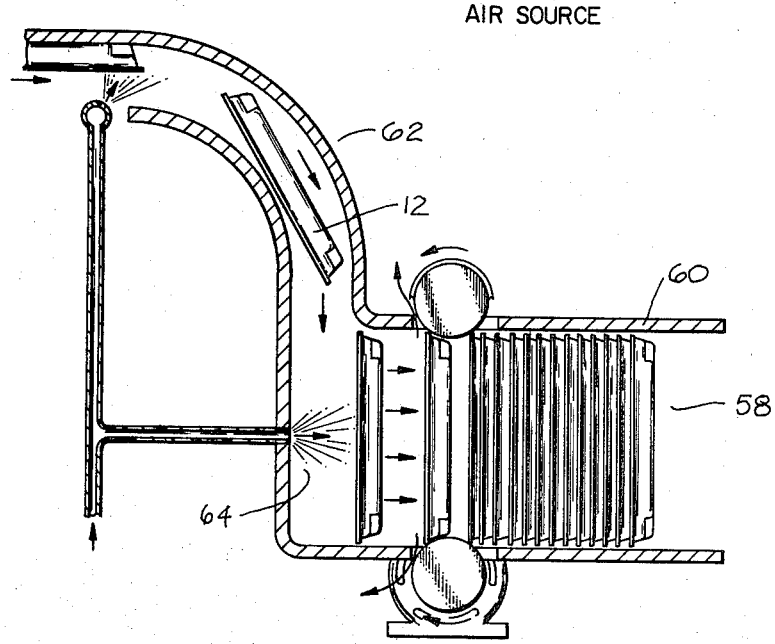
FIG. 2 is a view similar to FIG. 1 of an alternative form of the apparatus of the invention.

Apparatus 10 comprises a conveying duct 14 fabricated, for example, from lightweight metal or plastic, for transporting trays 12. Duct 14 has an article receiving end 16 which is the end mounted adjacent the discharge of the apparatus of FIG. 2, U.S. Pat. No. RE 26,413, and an article discharge end 18 angularly oriented with respect to receiving end 16. In the illustrated embodiment of FIG. 1, discharge end 18 is at 90° to receiving end 16, however, it may be at any intermediate acute angle, or as illustrated in the embodiment of FIG. 2, it may be oriented in the same direction as that of receiving end 16.

Apparatus 10 further includes means 20 adjacent to or within receiving end 16 for introducing high velocity conveying air into duct 14. In the illustrated embodiment these means include a conduit 22 immediately adjacent the article discharge end of the shaping equipment of U.S. Pat. No. RE 26,413. Conduit 22 has a plurality of angularly oriented openings or holes 24 formed in the wall thereof for passage of pressurized air therethrough. Openings 24 are preferably at an angle of between 15° to 70° with the horizontal. Conduit 22 is connected to a suitable conventional source of low pressure air, not shown. Supply duct 26 may have a branch 28 connected to an opening 30 in duct 14 at the base of transition zone 32 for the purpose of introducing additional air to duct 14 to augment that supplied through conduit 20. Branch 28 may, for example, be required for the larger sizes of trays 12 but may not be necessary for the smaller sizes.

Apparatus 10 further includes dual friction wheels or rolls 34A and 34B immediately adjacent discharge end 18 of article conveying duct 14 which are aligned opposite each other. Wheels 34A and 34B are identical and always have peripheral portions such as 36A and 36B overlapping an imaginary extension 38 of the walls 40 of duct 14 defining discharge end 18. Though a pair of wheels are illustrated, obviously more than two extending in another direction may be used. Means, such as one or more motors 42, are provided for rotating wheels 34A and 34B continuously at constant speed in opposite directions. Obviously a common drive system or other conventional types of drive systems may be used to rotate wheels 34. Each of rolls 34 must have a surface portion which is slip resistant. One manner of accomplishing this is illustrated in the embodiment of FIG. 1 by means of a series of resilient rings 37 spaced from each other along the surface of each of wheels 34.

Wall means 46, the peripheral limits of which define a space incrementally larger than the peripheral area of trays 12, may be provided downstream of friction wheels 34 for confining stack 48 of tray 12. In situations where the continuously forming stack is not allowed to become excessively high, wall means 46 may not be required.

In operation, after trays 12 are shaped and trimmed in a conventional type of trim in place forming press, the sheet with the trays attached therein are advanced to an adjacent stripping roll in the manner described in U.S. Pat. No. RE 26,413. There the combination is passed across the stripping roll with the result that the articles are sheared out of or broken away from the sheet in a direction (horizontal) which is substantially collinear with the direction of sheet advance through the system upstream of the stripping roll. Discharge is at the rate of between 5 to 15 per second per row. Air jet 25 is located such that it impinges on the leading end of each successive tray 12 as it is being separated from the surrounding sheet, and, accordingly, trays 12 are introduced in tandem in an end to end relationship with respect to each other into stream 25 of high velocity air issuing through openings 24 of conduit 22. Because the velocity thus imparted to the individual articles by means of this air is considerably greater than that which they had prior to separation as determined by the speed of the sheet advance rolls, each individual article is accordingly pneumatically accelerated along duct 14 at a velocity which approaches that of the air but is somewhat less than it because of the mass of the article and the frictional effects of the inside surface of duct 14. This velocity, however, is substantially greater than the article velocity prior to separation from the sheet. Movement is away from the upstream thermoforming station to a transition zone 32 of conveying duct 14. During this portion of the movement the orientation of the periphery of each tray 12 with respect to the next succeeding tray is basically unchanged from that which each had while in the sheet, or in other words, is substantially the same as that existing on ejection from the shaping equipment.

In transition zone 32, and as illustrated in FIG. 1 of the drawing, the direction of movement of each tray 12 is changed 90° by means of the lifting force applied to each by the air in the duct below each tray and then advanced again but in the vertical direction because of the right angle configuration of duct 14. Accordingly, sheet orientation of the articles is maintained upstream of transition zone 32 with only one turn being required in zone 32 to put the trays in the proper orientation for stacking. In the present system there is no loss of article orientation with the consequent requirement of developing it again. Orientation between discharge and stack entry is controlled at all times by means of the conveying air and the duct configuration.

After change of direction in transition zone 32, the trays are in position for stacking. The open end 54 of the body of one tray 12 is adjacent the base 50 of the next succeeding tray, or, in other words the peripheries of successively moving articles leaving zone 32 are substantially parallel to each other. The articles thus aligned are then further advanced by the air such that the base to open end oriented trays are fed to the nip of or area between horizontally spaced friction wheels 34, rotating at between 5 to 30 feet per minute. The distance illustrated as 56 between the innermost portions of the maximum diameters of rotating wheels 34 (with rings 37 thereon) is incrementally less than the greatest dimension of tray 12 taken in the same direction, such that each tray, being of a resilient thermoplastic nature, is slightly compressed between the opposing resilient surfaces of rings 37 and accordingly frictionally advanced through nip area 56 across the ever-changing peripheral portions of continuously, oppositely and constantly rotating wheels 34. Accordingly, once a tray is compressively engaged by the surfaces of friction wheels 34, the conveying influence of the air thereon is terminated, the frictional forces between the edges of the tray and the wheel surfaces being greater than that of the conveying air. The air is allowed to freely discharge to the surroundings through slot 57 between rolls 34 and the furthest downstream surface of the exit end 18 of duct 14.

As each tray is advanced upwardly by oppositely rotating rolls 34, it eventually leaves the nip area 56, whereupon compressive forces acting thereon are relaxed and the tray rests by gravity on the surfaces of the rolls beyond the nip. Because of the orientation of the articles and the outwardly tapering configuration of sides 52 thereof, the body of the next tray will enter the body of the prior tray through the open end 54 thereof and may come to rest against stacking lugs (not shown) in the interior of the container. Thus during a period of operation, an ever-increasing stack 48 of trays 12 will form, being consecutively fed from the bottom and supported by the lowermost tray on wheels or rolls 34 beyond nip area 56. The trays thus collected are allowed to accumulate within the confining surfaces of wall means 46 until a sufficient number are present, whereupon they may be manually or automatically removed for further packaging.

In the embodiment of FIG. 2, trays 12 are shown as being collected in a stack which is oriented in a horizontal direction. Conventional means such as a resiliently mounted removable wall may be used at the foremost end of stack 58 to prevent the latter from collapsing within horizontally oriented wall means 60. In this embodiment, the trays are conveyed around a right angle bend 62 without changing the peripheral orientation of the articles with respect to each other before entering transition zone 64 for turning. Otherwise the system components are identical to that depicted in FIG. 1. Obviously other stack orientations intermediate those shown in FIGS. 1 and 2 may be formed in a similar manner with similarly configured components.

The above description and particularly the drawings are set forth for purposes of illustration only and are not to be taken in a limited sense.

Though the present invention may find application downstream of any type of plastic article shaping equipment such as blow or injection molding or post trim thermoforming systems, the particularly preferred application is in the thermoforming of articles from thermoplastic sheet material wherein discharge of the formed articles is collinear with the direction of movement of the sheet material. In such systems, the articles must be turned at an angle to the direction of discharge in order to put them in position for stacking and herein the invention plays a particularly important role, whereas in thermoforming systems where the article is released from the sheet in a direction perpendicular to advancement, it is usually already in a position to be stacked on release without requiring any further turning.

The particular shape and type of article (which alternatively may be considered to be a series of individual items removed from the equipment at one time) which may be handled by the system of the present invention may vary widely from that of a large sized jug to a shallow container lid. Generally speaking, however, as the length of the article in the direction of conveying before turning decreases in comparison with that of the overall vertical height of the article, conveying orientation stability is reduced and the tendency is increased for the article to tumble as it advances rather that to slide along the confining surface with a relatively fixed orientation. Therefore, the system functions best with shallow as opposed to deep drawn thermoplastic articles such as containers, wherein the ratio of the depth of the container to the minimum diameter of the opening at the top does not exceed 1/2. Also, in considering the articles suitable for handling by the invention, they obviously must be configured so that they may be bent slightly without being damaged on passing through the nip of the friction rolls. In this sense, articles having an unconfined free peripheral edge as opposed to a heavy outer wall are most preferable. Further with respect to the article, though the preferred and illustrated type is a container having an open ended body and sides which permit another similar item to enter the body to nest therein to keep the overall stack height at a minimum, it should be understood that articles which do not nest one within the other on stacking may also be suitably handled by the system.

Though the system has been illustrated and described with respect to a single row of cyclically discharging articles, the duct may be designed to extend in width across a plurality of rows with separator walls located within the duct to keep the articles from each row isolated from each other during conveying. In such an installation, individual friction rolls for each row of articles could be installed on a common shaft which would extend across all rows and be rotated by a single drive system.

The mass of the articles being collected and stacked plays an all important part in the success of the present invention. Thus, contrary to prior art approaches, the effectiveness of the system increases as the mass of the individual articles decrease, since the smaller the mass the easier it is to air convey and turn the articles. In any event, the article must be relatively light in weight, weighing between 3 to 60 grams and preferably between 3 to 30 grams.

To accomplish the accelerating function in the high speed system of the present invention, the velocity of the air on initially contacting the article must be substantially greater than the velocity of the article prior to removal from the sheet in order to insure a substantial spacing between successive articles. In other words, the air must accelerate the separated article in order to present it at the transition or turning zone for action thereon before the next succeeding separated article arrives at the station. Since acceleration represents change in velocity, the value of acceleration in the present invention is the difference between the velocity of the separated article under the influence of the air jet and the velocity of the article while still in the sheet during advancement up to the stripping roll which usually ranges between 120 to 500 ft. per minute. In order to provide sufficient acceleration for purposes of the present invention, the velocity of the air should be at least 4000 ft. per minute as measured on leaving the supply opening adjacent the entrance end of the conveying duct. At velocities above 18,000 ft. per minute the amount of air required is economically excessive, whereas at velocities below 4,000 ft. per minute sufficient acceleration for conventional sized thermoformed items is usually not achievable.

The upper and lower walls of the conveying duct of the invention are preferably parallel for articles having planar oriented bases and upper ends in order to provide maximum sliding contact therewith upstream of the transition zone, thereby minimizing any tendency to tumble or change peripheral orientation of the articles during movement. The vertical spacing between upper and lower walls has a direct effect on air velocity, the greater the space, the more air being required to maintain the desired velocity, and consequently, the walls must be kept relatively close. There must be, however, a distinct increment of vertical air space between these members below the articles being conveyed in order to provide room for the pressurized air pad which is responsible for turning the article in the transition zone and propelling it to the friction rolls.

It is obvious that many variations may be made from the embodiments herein set forth without departing from the spirit and scope of the invention as hereinafter claimed.

What is claimed is:

1. Apparatus for automatically stacking lightweight plastic articles ejected from plastic shaping equipment comprising;
   a. a generally horizontal conveying duct for said articles having an article receiving end and an article discharge end;
   b. means adjacent said receiving end for introducing high velocity conveying air into said duct;
   c. oppositely rotating dual friction wheels aligned opposite each other immediately adjacent and spaced above said discharge end, said wheels each having resilient-cylindrical portions overlapping an upward extension of the walls of the duct defining said discharge end;
   d. air jet means adjacent said discharge end for changing the direction of movement for said articles and for feeding said articles upwardly into the nip of said dual friction wheels; and
   e. means for continuously rotating said wheels at constant speed in opposite directions whereby articles fed to the nip of said wheels are successively, frictionally advanced therethrough forming a stack of articles thereabove resting directly on said cylindrical portions of the wheels.

2. The apparatus of claim 1 in which said upward extension of the duct extends downstream of said friction wheels for confining said stack.

3. The apparatus of claim 1 in which said resilient-cylindrical portions comprise a plurality of axially spaced resilient rings on the surfaces of each of said friction wheels.

4. The apparatus of claim 1 wherein said means for introducing high velocity air includes a conduit having a plurality of angularly oriented openings therein for passage of pressurized air therethrough.

5. The apparatus of claim 1 wherein the upward extension of said duct includes slots therethrough adjacent said friction wheels for the discharge of pressurized air from said duct.

6. The apparatus of claim 4 wherein the openings are holes oriented at an angle of between 15° to 70° with the horizontal.

* * * * *